United States Patent [19]

Girardin

[11] Patent Number: 4,733,038
[45] Date of Patent: Mar. 22, 1988

[54] CONTACT MEMBER FOR SUPPLYING ELECTRICAL CURRENT TO AN ELECTRO-EROSION WIRE ELECTRODE

[75] Inventor: Roger Girardin, Vernier, Switzerland

[73] Assignee: Charmilles Technologies S.A., Geneva, Switzerland

[21] Appl. No.: 934,193

[22] Filed: Nov. 24, 1986

[30] Foreign Application Priority Data

Nov. 22, 1985 [CH] Switzerland ............... 4996/85

[51] Int. Cl.⁴ .................. B23H 7/04; H01R 41/00
[52] U.S. Cl. ...................... 219/69 W; 219/137.61; 439/5
[58] Field of Search .............. 219/69 W, 137.61; 339/118 R, 118 RY; 439/5; 204/206

[56] References Cited

U.S. PATENT DOCUMENTS

| | | | |
|---|---|---|---|
| 2,066,588 | 1/1937 | Taylor | 219/69 W |
| 2,428,546 | 10/1947 | Breitenstein | 339/16 C |
| 2,832,056 | 4/1958 | Stutzman | 429/5 |
| 3,022,479 | 2/1962 | Rohrbach | 339/118 RY |
| 3,267,253 | 8/1966 | Gueugnier | 339/118 R |
| 3,835,436 | 9/1974 | Klaudy | 339/118 RY |
| 4,250,371 | 2/1981 | Haug et al. | 219/69 W |
| 4,263,116 | 4/1981 | Inoue | 219/69 W |
| 4,566,744 | 1/1986 | Engelenburg et al. | 339/118 RY |

FOREIGN PATENT DOCUMENTS

| | | | |
|---|---|---|---|
| 2809339 | 9/1978 | Fed. Rep. of Germany | 219/69 W |
| 453272 | 1/1975 | U.S.S.R. | 219/69 W |
| 488677 | 1/1976 | U.S.S.R. | 219/69 W |
| 233810 | 10/1977 | U.S.S.R. | 219/69 W |

Primary Examiner—A. D. Pellinen
Assistant Examiner—Geoffrey S. Evans
Attorney, Agent, or Firm—Gifford, Groh, VanOphem, Sheridan, Sprinkle and Dolgorukov

[57] ABSTRACT

A contact device for an electrical current supply of an electrode wire operating in an electro-erosion machine having an electrical conducting part, mounted in free rotation and solidly attached to a shaft extending perpendicularly to the plane of rotation. The shaft is, preferably, also conducting and extends through a leak-proof cavity, containing a conductive fluid, such as mercury for example. The conducting part is preferably a steel roller, provided either with a V-shaped groove on its periphery, or animated with a back and forth movement parallel at its axis of rotation.

10 Claims, 7 Drawing Figures

CONTACT MEMBER FOR SUPPLYING ELECTRICAL CURRENT TO AN ELECTRO-EROSION WIRE ELECTRODE

BACKGROUND OF THE INVENTION

The present invention relates to a contact member for supplying electrical current to a wire electrode on a machine for electro-erosion.

On an electro-erosion cutting machine using an electrode wire, the latter runs continuously during the machining operation and, therefore, it is necessary to supply the machining current, as well as an eventual auxiliary current by means of a contact with respect to which the wire is moved. For that purpose, it is usual to slide the wire on a friction member, generally having a convex surface, for example a fixed device, having the shape of a pulley or finger or a rotating cylinder around a fixed axis, the latter being made of tungsten, preferably, or other friction and heat resistant material and connected to a current generator. The relatively high traction exercised on the wire during its passage in the machining zone causes the wire to exert a strong pressure against the friction member, resulting in a fast wear of said friction member located at the running point of the wire, and requires it to be replaced periodically, even if it is made of a very strong abrasion-resistant material. Furthermore, the dry friction of the wire on the friction member causes an effect on the wire tension behind the friction member which can be hardly controlled because it depends, among other, on the amount of wear. Further, the intensity of the supply current, and since it is established generally by a single tangential surface, necessitates a strong wire pressure against the friction member for the purpose of improving the contact.

Because of the friction it creates, the wire deposits on the friction member a layer of material of which the wire is made, for example, copper, cadmium, tungsten or molybdenum or alloy oxide of these materials as, for example, brass. This creates micro-welds between the wire and the friction member. The thin layer is also due to the micro-discharges releasing enough heat to cause local melting of the material which forms the surface of the wire. The micro-welds interfere with the proper operation of the wire and impede the regulating of the machining current. Furthermore, the wire friction on the contact member digs a groove in the latter. It has also been observed that when the depth of the groove is equal to the radius of the wire, the risk of wire breakage increases considerably. It becomes then necessary to use another part of the friction member or to swap it. Furthermore, because of the wire abrasion, powder or chips appear at the site. The relatively high pressure of the wire against the friction member tends also to deform the wire, which interferes with high precision machining.

The present invention aims to eliminate these defects and to create an excellent electrical contact between the wire and the electrical supply source. For that purpose, the contact member, according to the present invention, is characterized by a conducting member designed as a freely rotating part which is attached solidly to a shaft arranged perpendicularly to the plane of rotation. This shaft is preferably made to be conducting and extends into a cavity containing a quantity of conducting fluid such as a paste or liquid, establishing electrical contact between the shaft and the conducting internal surface, of the cavity.

It is advantageous to use a metal roller as the conducting part, which can have a V-shaped groove on its periphery.

The present invention substantially eliminates all friction, and therefore, increases the longevity of the contact member and makes it possible to provide the wire with large currents without creating hot points. For example, when the friction members are made of tungsten, as in the present state of the art, they must be replaced in about 30 hours of operation; a member made according to the present invention, when made of bronze, for example, can be used at least for approximately 600 hours permitting the establishment of an automatic procedure for electroerosion machining. If the conducting part is made of tungsten, the utilization period can be even longer.

Another advantage introduced by the substantial elimination of friction is that it is possible to fabricate the conducting part of a material which does not necessarily have a great resistance to abrasion, and therefore which is less expensive than tungsten, such as an alloy as bronze or stainless steel.

Another additional advantage is substantially the absence of abrasion of the electrode wire which remains practically intact. It does not create tracks due to friction. Furthermore, there is no presence of powder or chips due to abrasion.

The disappearance of hot spots reduces the wear of the electrode wire and the risk of breakage of the latter.

With the contact members of the present invention, it is now possible to increase greatly the amount of current flowing through the wire electrode without causing the breakage of the latter.

Furthermore, in most cases, due to the disappearance of hot spots, it is possible to eliminate contact lubrication altogether.

The contact member of the present invention assures a good contact with the conducting wire, because the contacting part and its shaft are driven together during their rotation. The current flow passing from the shaft into the contacting part is not made intermittent becaus of the play of the shaft in the rotating part, as it was the case for certain friction members used in the present state of the art.

The quality of the contact is further improved in the case of the mercury contact utilized in one of the preferred form of execution used in the present invention. This type of contact insures a permanent passage of current between the shaft and the body of the contact member connected to the generator, because the contact is independent of the rotation of the shaft. Furthermore, the movement of the latter does not suffer from the braking effect caused by a friction part supplying the current to one of the rounded ends of the shaft, generally made of carbon, and held in position by a spring against the rounded end. The current supply by mercury contact provides many other advantages over the supply using a carbon, for example. In particular, the contact surface is obviously larger, because it is not limited to the area of a rounded tip, since the end of the shaft is completely submerged on a given surface. There is no need to take in account the wear of the carbon (very fast) which gives a real autonomy to the assembly, since there is no need to replace any of the parts for many hours of operation (several days).

Because of the excellent quality of the contact obtained with contact member of the present invention, it is now possible to reduce the wire pressure on the contact member and, therefore to reduce the plastic deformation of the wire. Furthermore, since it is known from the present state of the art, that this wire pressure is determined by the curvature of the wire, with the present invention, it is now possible to reduce said curvature. This reduces the wire pressure on the auxiliary guides made of sapphire, located in front of the upper contact and behind the down contact. This results in a substantial reduction of the wire abrasion produced on the sapphire surfaces of these guides.

The loss of electrical energy is enormously reduced. Furthermore, because of the minimal size of the contact member (approximately 12 mm in diameter for the conducting part and 1 mm$^3$ of mercury is sufficient to provide an excellent contact and, in certain cases, there is no need to have a lubricant supply system) it is now possible to install it in the immediate proximity of the machining area which further reduces the losses of energy. Therefore, an important improvement of the machining current control is obtained.

All of these advantages are obtained without introducing any inconvenience with respect to the contact members used in the present state of the art. In particular, the size of the contact members, according to the present invention is as small as any of the known friction members. It must be added that they are also orientable and work in any direction.

DESCRIPTION OF THE DRAWINGS

The invention will be illustrated now by the attached drawing, showing in schematic form, for sake of example, of the its designs: in that drawing.

DESCRIPTION OF THE PREFERRED EMBODIMENT OF THE PRESENT INVENTION

Figure 1:
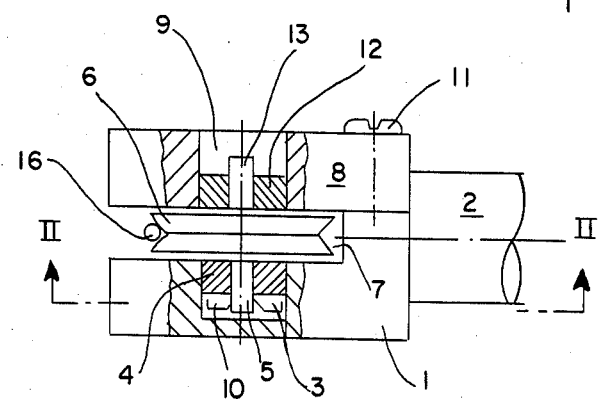
FIG. 1 illustrates a plan view of a contact member according to the invention.

As can best be seen in FIG. 1, reference numeral 1 identifies the body of the contact member which could be made in one piece with a bar 2 used to install the member on an electro-erosion machine tool (not shown). The body 1 has a blind bore 3 in which is inserted a stone 4 made of sapphire, for example, normally used in precision tool instruments. This sapphire forms a bearing on one end 5 of the shaft attached solidly to a roller 6 made of bronze provided with a V-shaped groove 7 on its periphery. A cover 8 is drilled and provided with a cylindrical hole 9 and is attached with screws, one of which is visible at 11, to the body 1 of the contact member.

Still referring to FIG. 1, another bearing 12 made of sapphire is centered in the hole 9 and supports the shaft of the roller 6 at its other end 13. The cavity formed by the blind bore 3, the first sapphire 4 and the first end 5 of the roller shaft is partially filled with a few mm$^3$ of conducting fluid, such as, for example, mercury, as shown at 15 in FIG. 2 (for the sake of drawing clarity, no attempt was made to show the mercury in FIG. 1).

Figure 2:
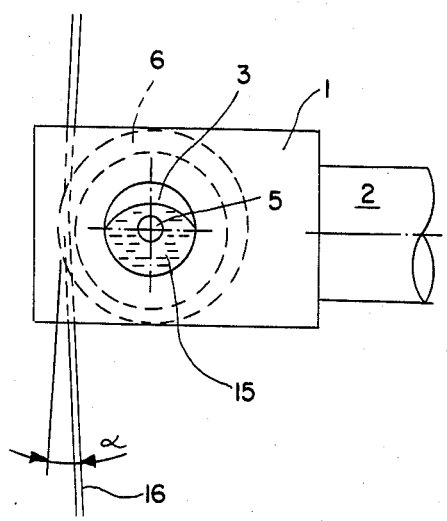
FIG. 2 illustrates a section of FIG. 1, indicating, among others, the approximate position of the electrode wire.

This mercury 15 makes for an ideal electrical contact between the metal body 1 of the contact member and the assembly shaft-roller which is also metal made and on which runs the electrode wire 16, as shown in FIG. 2. The electrical resistance between the body member 1 and the roller 6 is almost zero. Because of the high superficial tension of mercury 15, the latter will not escape from the cavity where it is enclosed, even when the provided play between the shaft and the sapphire 4 is approximately 2 mm, given the fact that part 5 of the shaft engaged in the cavity is completely immersed.

It is possible, if desired, to provide a circular gasket made of teflon or other elastic material, as shown in 10, which will be crimped to the end 5 of the shaft, in order to form an additional tight joint to prevent fluid leakage. Such a gasket 10 could be useful, in particular, when use is made of a conducting paste or a liquid other than mercury.

Finally, electrical connection to contact member 1 will be made, in a manner not shown on the drawing, (for example, via bar 2 which serves also as a mounting mandrel) to the machining electrical supply source. The electrical contact between body 1 and roller 6 is excellent. Circular wire section 16 is placed in the groove 7 of the roller 6 and touches the latter without sliding on its surface, therefore doing it without friction and, resting on the two sides with respect to the V-shaped groove 7 and not on a single contact surface as it does when sliding on a large radial friction slider. This absence of friction makes it possible to supply the wire with strong electrical currents without producing hot spots and without having to exert strong pressure on the roller. For the same applied tension to the wire, it is possible to reduce the angle to about 2° (shown in an exaggerated manner on the drawing) to about ½ of its value of 4°, resulting in a lesser amount of plastic deformtaion of the wire. Finally, the simplicity of the assembly permits a compact design of the contact member making it possible to install it in the immediate site of the machining area. In particular, it can be mounted on an electro-erosion machining with the help of the bar 2, for example on the guiding heads at the location of an assembly containing the classical friction member, without making any modification to the machine.

The present invention is not intended to be limited by the above description of a preferred embodiment thereof. In particular, it should be noted that it is possible to close the hole 9 with an external cover (not shown on the drawing) in order to form a second closed chamber and to put into it a small quantity of conducting fluid which would make it possible to have the supply current to flow in a symmetrical manner with respect to the two shaft ends 5 and 13.

Also, the conducting parts can be designed with a variety of conducting materials, less expensive and more available than tungsten, for example, alloys such as bronze and all kinds of stainless steels and also conducting ceramics. The range of choices is large and is well known to one skilled in the art.

In certain designs, the machining current can be provided, for example, with a connection which would work together with the rotating shaft of the conducting part or be situated directly on said conducting part.

Instead of mercury, the conducting fluid can be, for example, a metal alloy having a low melting point such as being used in the dental art or a paste containing a conducting powder, preferably metallic. The contacting member can be made removable, retractable or pivotable so that it can be moved out of the way, if necessary, of its servicing position.

It is also possible to provide two or more contacts according to the present invention, on either side of the wire. In a particular way, such a design is shown in FIG. 3, which can be very advantageous.

Figure 3A:
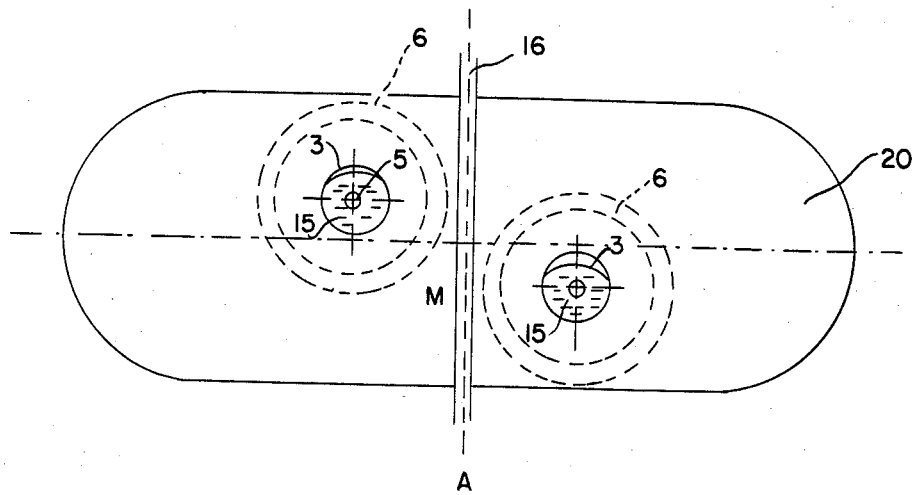
FIGS. 3a and 3b illustrate a device calling for two contact members.
Figure 3B:
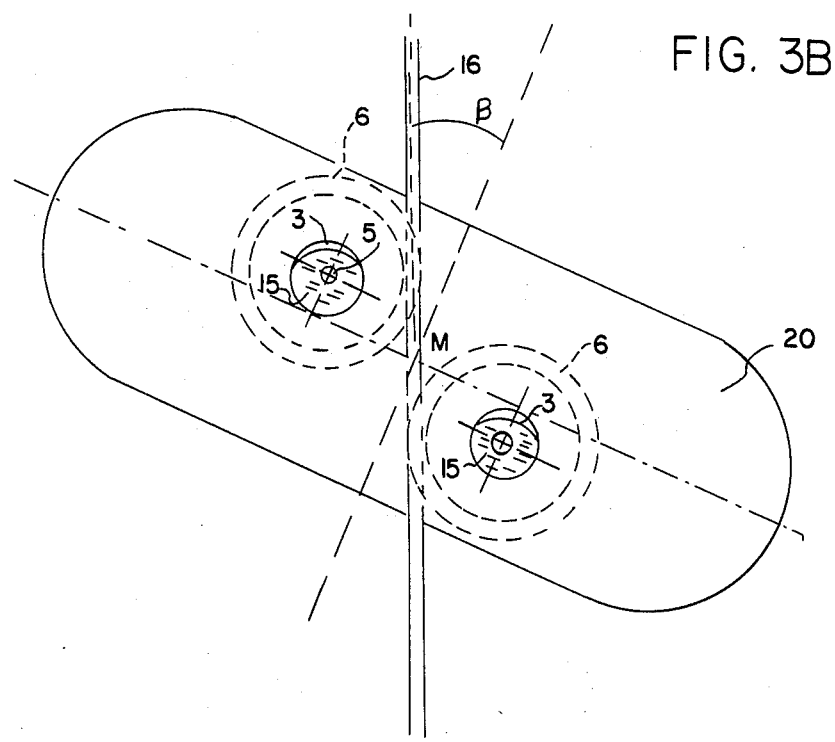

Most elements shown in FIGS. 1 and 2 are also shown in FIG. 3 and carry the same reference numeral. This device has two rollers 6, both mounted on the same metal bracket 20, electrically connected to the machining current source. In the resting position, the symmetrical plane of said bracket 20 contains the symmetrical axis A of the electrode wire (FIG. 3a), the wire 16 is not in contact with any of the two rollers 6. When in the operating position, the symmetrical plane of the bracket 20 is inclined at an angle beta with respect to the axis A (FIG. 3b). The two rollers 6 are then in contact with the electrode wire 16. This rotated angle beta of bracket 20 around point M can be effected by all kinds of known means (hydraulic, electric, magnetic, etc.).

The two rollers 6 can be easily positioned, putting them in service position, i.e., in contact with wire 16 or out of service. The contacting surface is double, which increases the quality of the contact. Finally, because of the double action of the wire 16, the resulting deformation of the wire 16 is practically nil.

Figure 4A:
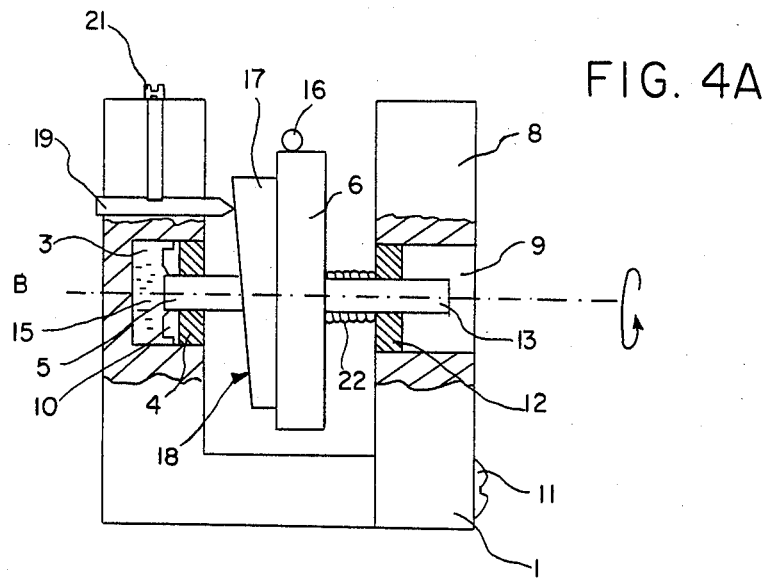
FIGS. 4a; 4b and 5 illustrate another kind of design of a contact member according to the present invention.
Figure 4B:
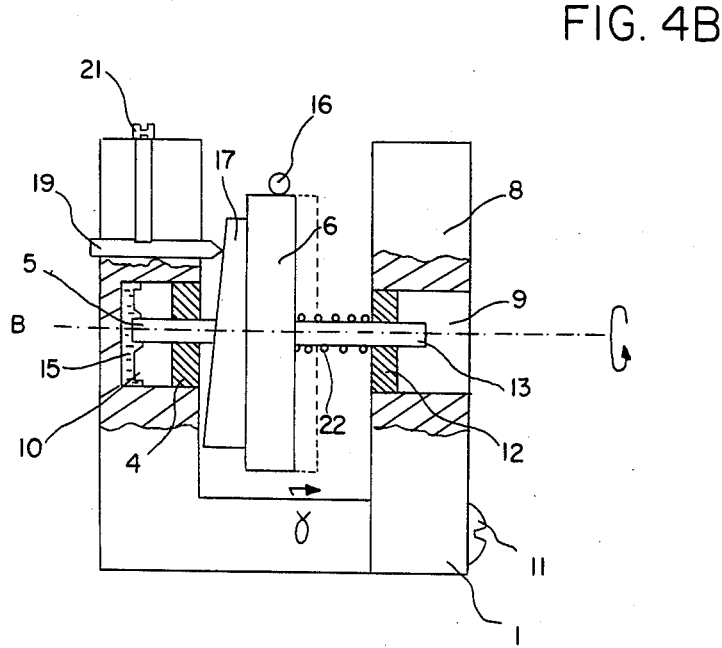

A third interesting type of design is shown in FIGS. 4a and 4b. It deals with a contact member whose rotating part is not a V-groove shaped roller but a straight roller 6. It is animated with a back and forth movement on each of its rotations, along its axis of rotation B. Most of the elements of FIGS. 1 and 2 are also found in FIGS. 4a and 4b and carry the same reference numerals. The back and forth movement is obtained with the aid of part 17 which is attached to one face of the roller 6 and whose external face 18 is cut obliquely with respect to the contact surface of the roller 6. During the rotation of the roller 6 around its axis, this face 18 rests on a finger 19, located in parallel with the axis of the roller 6 and held in place by a screw 21 with the help of a spring 22, which tends to push the roller 6 back towards the finger 19. At each half rotation of the roller 6, the latter displaces itself a distance alpha in the direction of its symmetrical axis B. As shown at FIG. 4a, the spring 22 is compressed, the roller 6 has moved as far as possible from the finger 19. As shown at FIG. 4b, one turn after, roller 6 comes as closed as possible to finger 19. Spring 22 is now decompressed and the wire electrode 16 is in contact with the edge of the roller 6 which is now located at the furthermost distance from the finger 19. Thus, at each half turn of the contacting member, the wire 16 displaces itself from one end to the other of the contacting surface of the roller 6.

Figure 5:
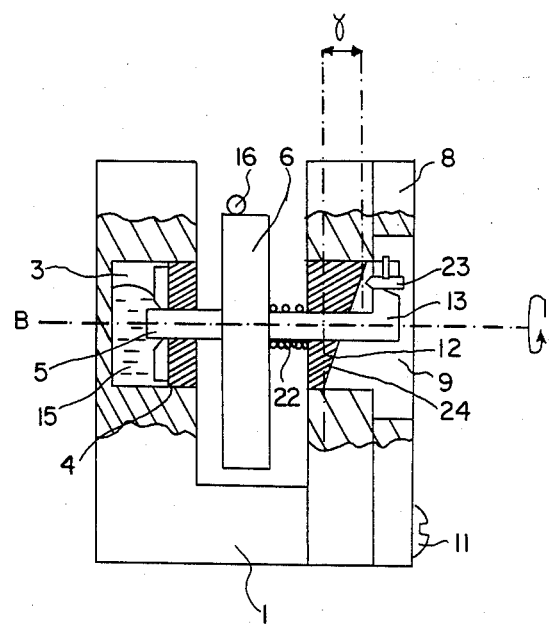

Another possible design of a contact member whose roller makes a back and forth movement in the direction of its symmetrical axis B is shown in FIG. 5 where most of the elements of FIGS. 1 and 2 can also be found.

The back and forth movement of the roller 6 in the direction of the attached shaft is obtained with the help of a finger 23 made, for example, of sapphire, located parallel to this shaft and mounted on the end 13 of the latter. During rotation of the roller 6, the finger 23, because of the action of spring 22 which tends to push the assembly shaft-roller comes into contact with the face 24, which is cut obliquely from the bearing 12, thus moving the roller 6 along its axis of rotation. As with the design shown at FIG. 4, the roller 6 is displaced along its symmetrical axis B, at each half rotation, a distance alpha, whereas the electrode wire 16 displaces itself from one edge to the other of the contacting surface of the roller 6.

The longevity of such a contact member is longer than that of the contact member shown at FIG. 1, because all the surface of the roller section forms the contacting surface, which diminishes further wear of the latter, because the wear is distributed on all the roller section rather than being localized in the bottom of a groove. From the preceding, it is clear that the design types of the present invention can be varied in an infinite way. The contact member of the present invention can be used not only for the supply of the machining current, but also to provide an eventual heating which is required to be performed in certain cases of before to thread the wire-up. In fact, for certain types of copper wires or wire alloys rich in copper, for example, it is advantageous to straighten the wire by circulating a current furnished by a heat generator between the present contact and a second one located on a pulley shaft located in front of it.

Having thus described the present invention by way of an example of structure well designed for accomplishing the objects of the invention, modifications whereof will be apparent to those skilled in the art, what is claimed as new is as follows:

1. A contact device for the supply of electrical current to an electrode wire operating in an electro-erosion machine during the machining operation comprising:
   an electrically conductive body having a pair of spaced apart arm portions defining a slot therebetween, said body having a bore extending on a generally horizontal axis transversly across said pair of arm portions, said bore extending partially into at least one of said pair of arm portions to form a cavity;
   a pair of bearing members, each of said pair of bearing members mounted in said bore in a respective one of said pair of arm portions, each of said pair of bearing members having an aperture coaxial with said axis of said bore, one of said bearing members covering said cavity of said at least one of said pair of arm portions;
   a shaft of electrically conductive material rotatably mounted in said aperture of each of said pair of bearing members; and having an end portion extending into said cavity;
   a roller of electrically conductive material fixedly mounted on said shaft in said slot between said pair of bearings, said roller mounted to rotate with said shaft, said roller contacting said electrode wire,
   a conducting fluid sealingly enclosed in said cavity, said conducting fluid covering said end portion of said shaft such that electrical current is conducted by said conducting fluid from said body to said shaft and thereby to said roller and said electrode wire.

2. The contact device of claim 1, further comprising:
   a finger extending parallel with said shaft into said slot,
   a face portion mounted on said shaft adjacent said roller contacting said finger, said face portion extending obliquely to a plane of rotation of said roller; and
   biasing means for biasing said face portion against said face portion, said roller moving reciprocally axially when said roller is rotated and said finger contacts said face portion.

3. A contact device according to claim 1 characterized by said roller being a metal roller.

4. A contact device according to claim 1 characterized by said roller having a V-shaped groove on a peripheral portion.

5. A contact device according to claim 3, characterized by back and forth movement of said roller parallel to its axis of rotation.

6. A contact device according to claim 1, characterized by said quantity of said conducting fluid being sufficient to immerse completely said end of said shaft engaged in said cavity.

7. A contact device according to claim 1, characterized by said conducting fluid being mercury.

8. A contact device according to claim 1, wherein said pair of bearings comprise hard stone in which said shaft is adjusted with close tolerance in order to prevent fluid leakage from said conducting fluid in said cavity.

9. A contact device according to claim 1, characterized by an elastic gasket disposed between the said shaft and one of said bearings in said cavity to seal said cavity.

10. A contact device according to claim 1, further comprising a mounting spindle for its mounting onto an electro-erosion machine.

* * * * *